(12) United States Patent
Xiong et al.

(10) Patent No.: US 11,882,556 B2
(45) Date of Patent: Jan. 23, 2024

(54) TRANSMISSION OF PHYSICAL UPLINK CHANNELS AND SIGNALS FOR NEW RADIO BEAMFORMED SYSTEM

(71) Applicant: Apple Inc., Cupertino, CA (US)

(72) Inventors: Gang Xiong, Portland, OR (US); Bishwarup Mondal, San Ramon, CA (US); Guotong Wang, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 353 days.

(21) Appl. No.: 17/282,931

(22) PCT Filed: Oct. 4, 2019

(86) PCT No.: PCT/US2019/054680
§ 371 (c)(1),
(2) Date: Apr. 5, 2021

(87) PCT Pub. No.: WO2020/072893
PCT Pub. Date: Apr. 9, 2020

(65) Prior Publication Data
US 2021/0410165 A1 Dec. 30, 2021

Related U.S. Application Data

(60) Provisional application No. 62/742,083, filed on Oct. 5, 2018.

(51) Int. Cl.
*H04W 72/1268* (2023.01)
*H04L 5/00* (2006.01)
*H04W 72/044* (2023.01)
*H04W 72/566* (2023.01)

(52) U.S. Cl.
CPC ......... *H04W 72/1268* (2013.01); *H04L 5/001* (2013.01); *H04L 5/0048* (2013.01); *H04W 72/046* (2013.01); *H04W 72/569* (2023.01)

(58) Field of Classification Search
CPC .......... H04W 72/1268; H04W 72/046; H04W 72/569; H04L 5/001; H04L 5/0048; H04L 5/0044; H04L 5/0053; H04L 5/0055; H04L 5/0057; H04L 5/0064; H04B 7/0408; H04B 7/0617
See application file for complete search history.

(56) References Cited

U.S. PATENT DOCUMENTS

2019/0357178 A1 11/2019 Bae et al.
2022/0225362 A1* 7/2022 Yi ....................... H04W 72/046

FOREIGN PATENT DOCUMENTS

WO   WO 2018-143741 A1   8/2018

OTHER PUBLICATIONS

International Search Report and Written Opinion of the International Searching Authority directed to related International Patent Application No. PCT/EP2019/054680, dated Jan. 23, 2020; 10 pages.

(Continued)

*Primary Examiner* — Kyaw Z Soe
(74) *Attorney, Agent, or Firm* — Sterne, Kessler, Goldstein & Fox P.L.L.C.

(57) ABSTRACT

Embodiments of the present disclosure provide for transmission of physical uplink channels and signals scheduled for simultaneous transmission. Other embodiments may be described and claimed.

20 Claims, 8 Drawing Sheets

(56) References Cited

OTHER PUBLICATIONS

3GPP TS 38.213 V15.3.0, "3GPP; TSGRAN; NR; Physical layer procedures for control (Release 15)," Oct. 1, 2018.
Huawei et al., "Remaining issues on simultaneous reception or transmission over CC/BWP(s)," R1-1810102, 3GPP TSG RAN WG1 Meeting #94b, Chengdu, China, Sep. 29, 2018.
Intel Corporation, "Remaining details on NR PUCCH," R1-1810755, 3GPP TSG RAN WG1 Meeting #94b, Chengdu, China, Sep. 29, 2018.
NIT Docomo, Inc., "Simultaneous Tx/Rx for physical channels," R1-1811353, 3GPP TSG RAN WG1 Meeting #94b, Chengdu, China, Sep. 29, 2018.
Ericsson, "On simultaneous transmission and reception in FR2," R1-1811549, 3GPP TSG RAN WG1 Meeting #94b, Chengdu, China, Sep. 29, 2018.
3GPP TS 38.214 V15.3.0, "3GPP; TSGRAN; NR; Physical layer procedures for data (Release 15)," Oct. 1, 2018.

* cited by examiner

```
┌─────────────────────────────────────────────┐
│ Determining first and second PUCH transmissions are to │
│   be transmitted in different component carriers with  │
│              different spatial filters                 │
│                        704                             │
└─────────────────────────────────────────────┘
                        │
                        ▼
┌─────────────────────────────────────────────┐
│ Determining, based on priority rule, relative priorities of │
│         first and second PUCH transmissions            │
│                        708                             │
└─────────────────────────────────────────────┘
                        │
                        ▼
┌─────────────────────────────────────────────┐
│ Transmitting prioritized PUCH with its spatial filter and │
│ dropping de-prioritized PUCH transmission or transmitting │
│  de-prioritized PUCH transmission with spatial filter of  │
│            prioritized PUCH transmission               │
│                        712                             │
└─────────────────────────────────────────────┘
```

TRANSMISSION OF PHYSICAL UPLINK CHANNELS AND SIGNALS FOR NEW RADIO BEAMFORMED SYSTEM

CROSS REFERENCE TO RELATED APPLICATION

The present application claims priority to U.S. Provisional Patent Application No. 62/742,083, filed Oct. 5, 2018, and entitled "On Simultaneous Transmission of Physical Uplink Channels and Signals for New Radio Beamformed System." The disclosure of this application is hereby incorporated by reference in its entirety.

FIELD

Embodiments of the present invention relate generally to the technical field of wireless communications.

BACKGROUND

Mobile communication has evolved significantly. The next generation wireless communication system, 5G, or new radio (NR) will provide access to information and sharing of data anywhere, anytime by various users and applications. NR is a unified network/system targeted to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable wireless connections to deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
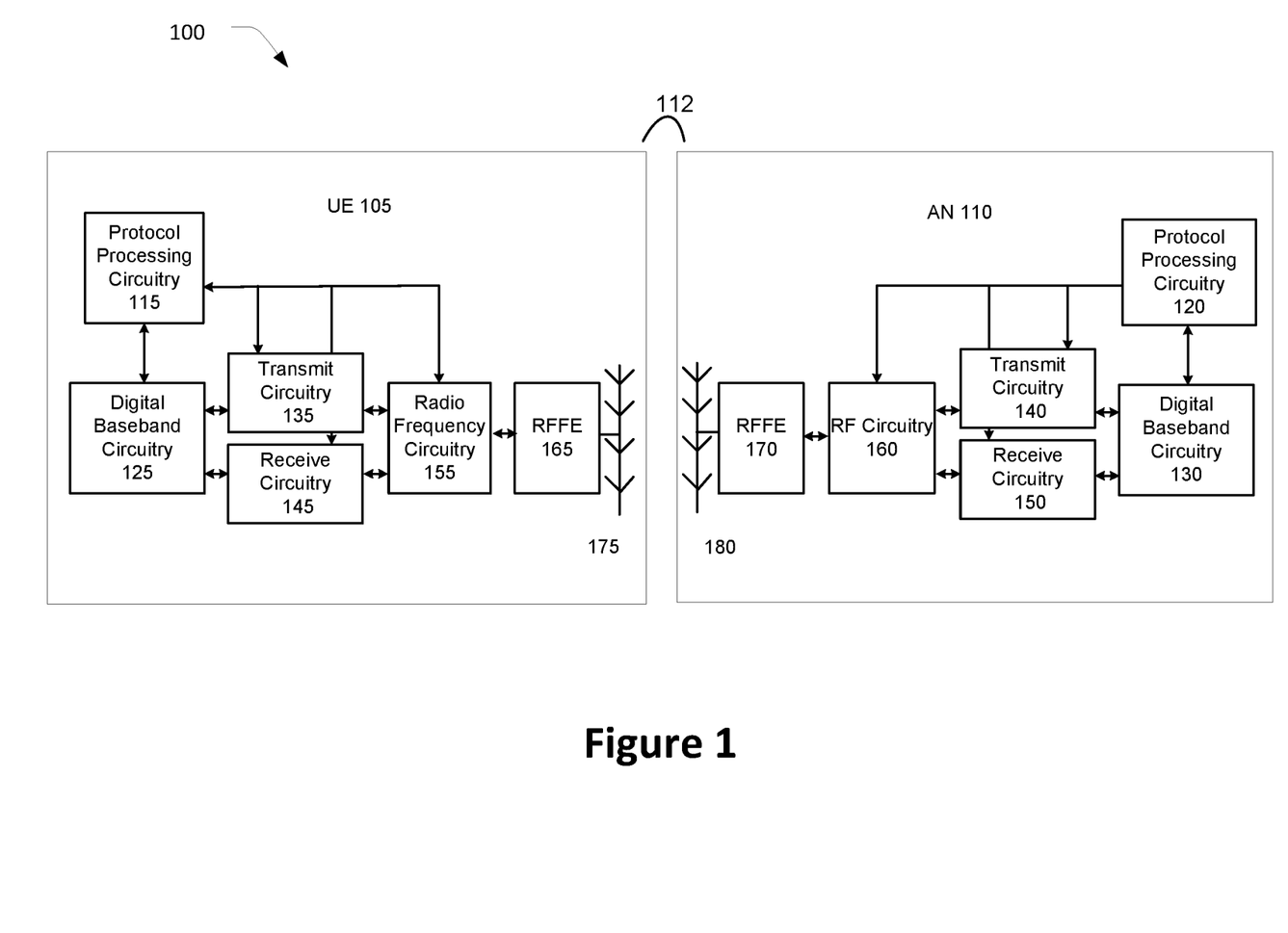
FIG. 1 illustrates a network in accordance with some embodiments.

FIG. 1 schematically illustrates an example wireless network 100 (hereinafter "network 100") in accordance with various embodiments herein. The network 100 may include a UE 105 in wireless communication with an AN 110. In some embodiments, the network 100 may be an NR or LTE network. The UE 105 may be configured to connect, for example, to be communicatively coupled, with the AN 110 via connection 112. In this example, the connection 112 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of hybrid automatic repeat request-acknowledgment (HARQ-ACK) functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175.

The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The transmission components of the UE 105 may apply a spatial filter to the data to be transmitted to form a transmit beam emitted by the antenna elements of the one or more antenna panels 180.

Figure 2:
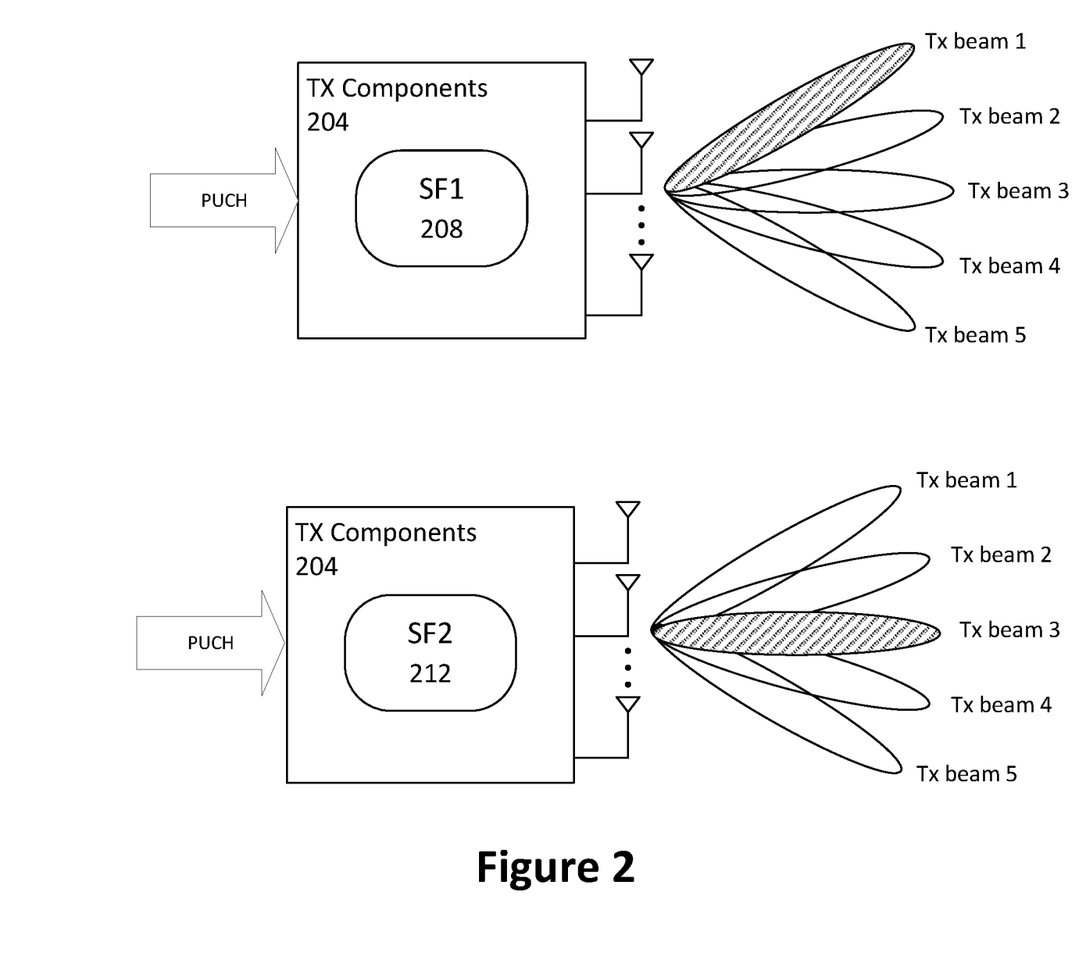
FIG. 2 illustrates two beamforming implementations in accordance with some embodiments.

FIG. 2 illustrates two beamforming implementations of the UE 105 in accordance with some embodiments. In particular, FIG. 2 illustrates transmit components 204, which may represent the components of the UE 105 involved with various beamforming operations. These components may include circuitry from one or more of the protocol processing circuitry 120, digital baseband circuitry 130, transmit circuitry 140, RF circuitry 160, RFFE 170, and the one or more antenna panels 180.

The transmit components 204 may be configured with a first spatial filter (SF1) 208 or a second spatial filter (SF2) 212. Each spatial filter may represent a set of parameters that may be applied to data/signals that may form a particular transmit beam. The parameters could include, but are not limited to, number of antenna elements, structure of antenna elements, phase and amplitude applied to a data/signal path, etc.

As shown, the transmit components 204 may apply SF1 208 to a physical uplink channel (PUCH) transmission to cause the PUCH transmission to be transmitted by a first transmit beam (TX beam 1) or may apply SF2 212 to the PUCH transmission to cause the PUCH transmission to be transmitted by a third transmit beam (TX beam 3). As used herein, transmitting a PUCH transmission with a particular transmit beam includes applying a spatial filter to data/signals of the PUCH transmission to provide the particular transmit beam.

In some embodiments, the UE 104 may determine spatial filters to be used for a particular PUCH by determining a transmit beam used by the access node 110. For example the UE 104 may receive a transmission (for example, a synchronization signal block, a CSI/reference signal, etc.) from the access node 110 and determine an associated transmit beam used for the transmission based on an index of the transmission. The UE 104 may use this information for spatial filters that may be used for both receive beams to receive the transmission from the access node 110 and transmit beams to be sent to the access node 110.

PUCH transmissions, as used herein, may include or otherwise refer to any uplink transmission in physical channels such as a physical uplink control channel (PUCCH), a physical uplink shared channel (PUSCH), a physical random access channel (PRACH). The PUCH transmission may also include or otherwise refer to physical signals transmitted in an uplink channel such as, but not limited to, a sounding reference signal (SRS).

The PUCCH may primarily be used to carry control information, the PUSCH may be primarily used to carry application data, and the PRACH may be primarily used for random access. However, in NR, uplink control information (UCI) can be carried by both PUCCH and PUSCH. In particular, UCI may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (for example, Layer 1-reference signal received power (L1-RSRP)).

A short duration NR PUCCH may be multiplexed with a PUSCH in a time division multiplexing (TDM) manner. This may be targeted for low latency application. For an NR PUCCH with long duration, multiple OFDM symbols can be allocated for NR PUCCH to improve link budget and uplink coverage for the control channel. More specifically, for an UL data slot, the NR PUCCH and PUSCH can be multiplexed in a frequency division multiplexing (FDM) fashion.

If the UE 105 is only equipped with one panel or one antenna subarray, the UE 105 may be able to form a single transmit (Tx) beam for the transmission of the physical uplink signal or channel. Thus, when physical uplink signals or channels are multiplexed in an FDM manner in different component carriers (CCs), and are indicated or configured with different Tx beams, the UE 105 may be able to only transmit one physical uplink channel or signal for a given time using the single Tx beam. Various embodiments describe how to handle such multiplexed uplink transmissions using only one Tx beam.

In particular, embodiments disclosed herein may be directed to mechanisms on handling simultaneous transmission of physical uplink channels and signals for NR beamformed systems. Some embodiments may be directed to: handling PUSCHs scheduled for simultaneous transmission with different Tx beams; handling PUCCHs scheduled for simultaneous transmission with different Tx beams; and handling PUCCH and PUSCH scheduled for simultaneous transmission with different Tx beams.

As mentioned above, if the UE 105 is only equipped with one panel or one antenna subarray, the UE 105 may be able to form a single analog Tx beam for the transmission of physical uplink signal or channel for all the CCs (possibly the entire band). This indicates that when physical uplink signals or channels are multiplexed in an FDM manner in different CCs, and are indicated or configured with different Tx beams, the UE 105 may be able to only transmit one physical uplink channel or signal for a given time using the configured or indicated Tx beam. In this case, the other physical uplink channel or signal may be dropped or may be transmitted with the same Tx beam. Hence, certain aspects may need to be defined to drop or de-prioritize one or more physical uplink channels/signals and only transmit one physical uplink channel/signal using an indicated or configured Tx beam.

As a general rule in accordance with some embodiments, in a case when the UE 105 does not support simultaneous transmission of more than one physical channel/signal using distinct Tx beams, if a first physical uplink channel/signal and a second physical uplink channel/signal are multiplexed in an FDM manner in different CCs, and if the first and second physical uplink channel/signal are indicated or configured with different spatial relations or quasi-collocated (QCL) assumptions or different Tx beams (which may be collectively referred to as "different spatial filters"), the UE 105 would transmit the physical uplink channel/signal with an earlier starting symbol using the indicated or configured Tx beam. The other physical channel/signal can be dropped or transmitted using the same Tx beam.

In embodiments, in cases when the first and second physical uplink channel/signal have the same starting symbol, the UE 105 may transmit the physical uplink channel/ signal on the serving cell with smallest serving cell index (ServCellIndex) using the indicated or configured Tx beam. The other physical channel/signal can be dropped or transmitted using the same Tx beam.

As used herein, the same Tx beam may indicate that there is the same downlink reference signal in the spatial relation information chain between two uplink signals/channels, or the downlink reference signals are QCLed with spatial Rx parameters (QCL-typeD). For example, if in CC 1, PUSCH is spatially related to SRS resource 1 and SRS resource 1 is spatially related to SSB 1, and in CC 2, PUSCH is spatially related to CSI-RS resource 2 and CSI-RS resource 2 is QCLed with SSB 1 in CC 1 with QCL-typeD, the PUSCH in CC1 and CC2 can be considered to use the same Tx beam.

Handling PUSCHs scheduled to be simultaneously transmitted with different Tx beams In some embodiments, the UE 105 may schedule PUSCHs to be simultaneously transmitted with different transmit beams. These situations may be handled as follows.

In cases when the UE 105 does not support simultaneous transmission of more than one physical channel/signal using distinct Tx beams, if a first PUSCH and a second PUSCH are multiplexed in a FDM manner in different CCs, and if the first and second PUSCH are indicated or configured with different spatial filters, the UE 105 may transmit the PUSCH of the serving cell with the smallest ServCellIndex and that is a grant-based PUSCH (for example, scheduled by DCI format(s) 0_0 or DCI format(s) 0_1) using the indicated or configured Tx beam. The other PUSCH can be dropped or transmitted using the same Tx beam. In cases when all PUSCHs are grant-free transmissions (for example, are configured by higher layer parameters ConfiguredGrantConfig or semiPersistentOnPUSCH), the PUSCH of the serving cell with the smallest ServCellIndex may be transmitted using the indicated or configured Tx beam. The other PUSCH can be dropped or transmitted using the same Tx beam.

In embodiments, in cases when the first PUSCH which is grant-based, for example, scheduled by DCI format(s) 0_0 or DCI format(s) 0_1, and the second PUSCH is a grant-free transmission, for example, configured by respective higher layer parameters ConfiguredGrantConfig or semiPersistentOnPUSCH, are multiplexed in an FDM manner using different Tx beams, the UE 105 may only transmit the first PUSCH and drop the second PUSCH or the UE 105 would transmit both PUSCH transmissions using the Tx beam that is configured for the first PUSCH.

Further, in cases when the first PUSCH, which is grant-based, and the second PUSCH, which is semi-persistently scheduled, are multiplexed in an FDM manner using different Tx beams, the UE 105 may only transmit the first PUSCH and drop the second PUSCH or the UE may transmit both PUSCH transmissions using the Tx beam that is configured for the first PUSCH.

Figure 3:
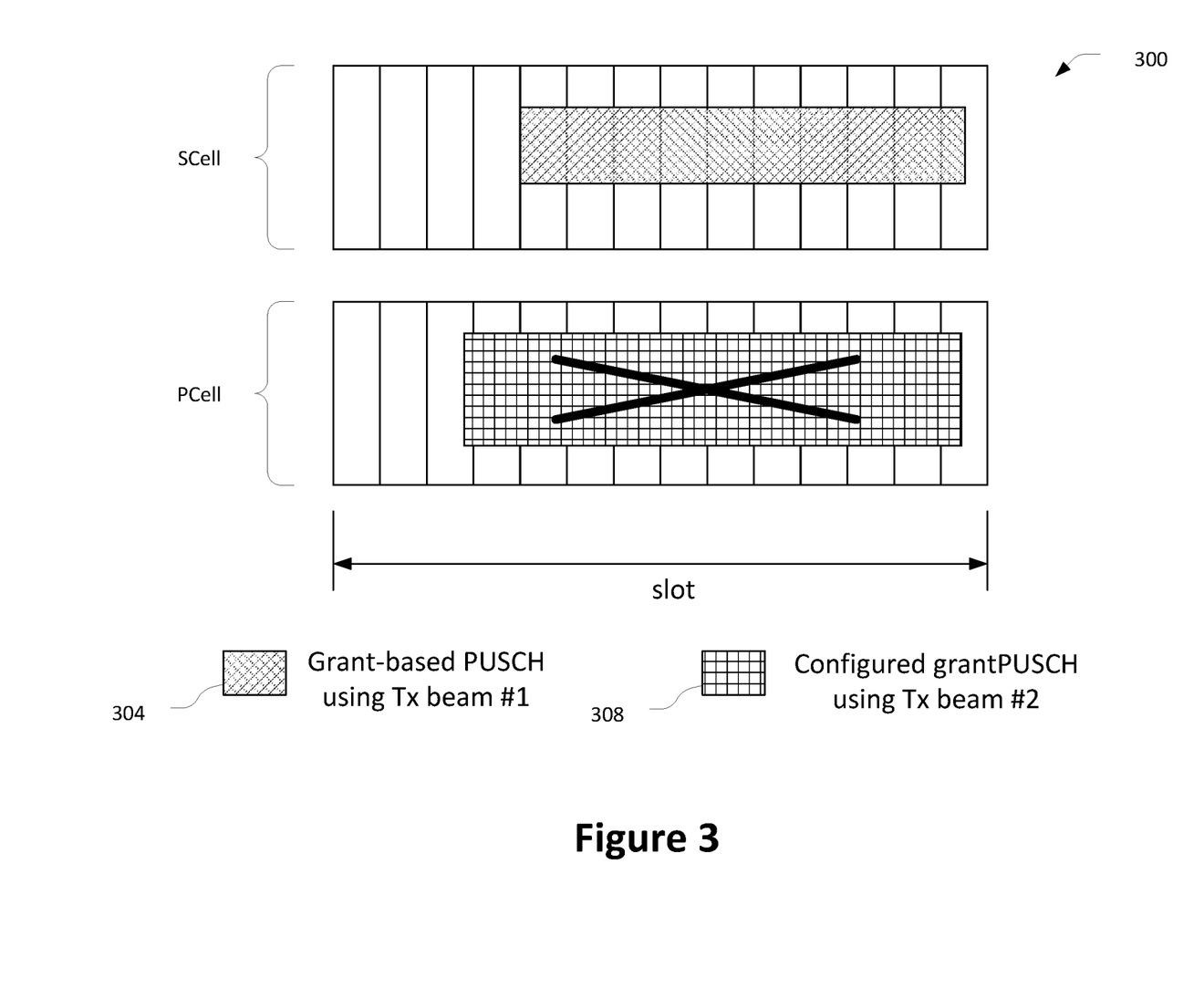
FIG. 3 illustrates a transmission scenario in accordance with some embodiments.

FIG. 3 illustrates a transmission scenario 300 in which PUSCHs are scheduled for simultaneous transmission with different Tx beams in different CCs in accordance with some embodiments. In the example, two PUSCH transmissions, PUSCH 304 and PUSCH 308, are with different Tx beams are multiplexed in a FDM manner in PCell and SCell, respectively. PUSCH 308 is a configured grant transmission and PUSCH transmission 304 is a grant-based transmission. Thus, in accordance with some embodiments, the UE 105 may drop the PUSCH 308 and transmit the PUSCH 304. Alternatively, the UE 105 may transmit the PUSCH 308 with the transmit beam used to transmit PUSCH 304, that is, Tx beam #1. While this beam may not be the most desirable beam for transmission of PUSCH 308, it may still be effective in some situations.

In embodiments, in cases when the UE 105 does not support simultaneous transmission of more than one physical channels/signals using distinct Tx beams, if a first PUSCH and a second PUSCH are multiplexed in an FDM manner in different component carriers (CC), if the first and second PUSCH are indicated or configured with different spatial filters, when a UCI is multiplexed on the first PUSCH and a UCI is not multiplexed on the second PUSCH, the UE 105 would only transmit the first PUSCH and drop the second PUSCH or the UE 105 would transmit both PUSCH using the Tx beam that is indicated or configured for the first PUSCH.

Further, when the first and second PUSCHs carry the UCI, the UE 105 would transmit the PUSCH carrying UCI with the highest priority or the UE 105 would transmit both PUSCH using the Tx beam of the PUSCH carrying UCI with the highest priority. The priority rule can be defined as HARQ-ACK feedback>SR>CSI with higher priority>CSI with lower priority. If multiple UCI types are carried by a PUSCH, the UCI type with the highest priority may be considered in the dropping rule.

In case in which two PUSCHs carry the same UCI type with same priority are multiplexed in an FDM manner, and the two PUSCHs are indicated/configured with different beams, the PUSCH on the serving cell with smallest serving cell index (ServCellIndex) may be transmitted or both PUSCH may be transmitted using the beam associated with the smallest ServCellIndex PUSCH.

Figure 4:
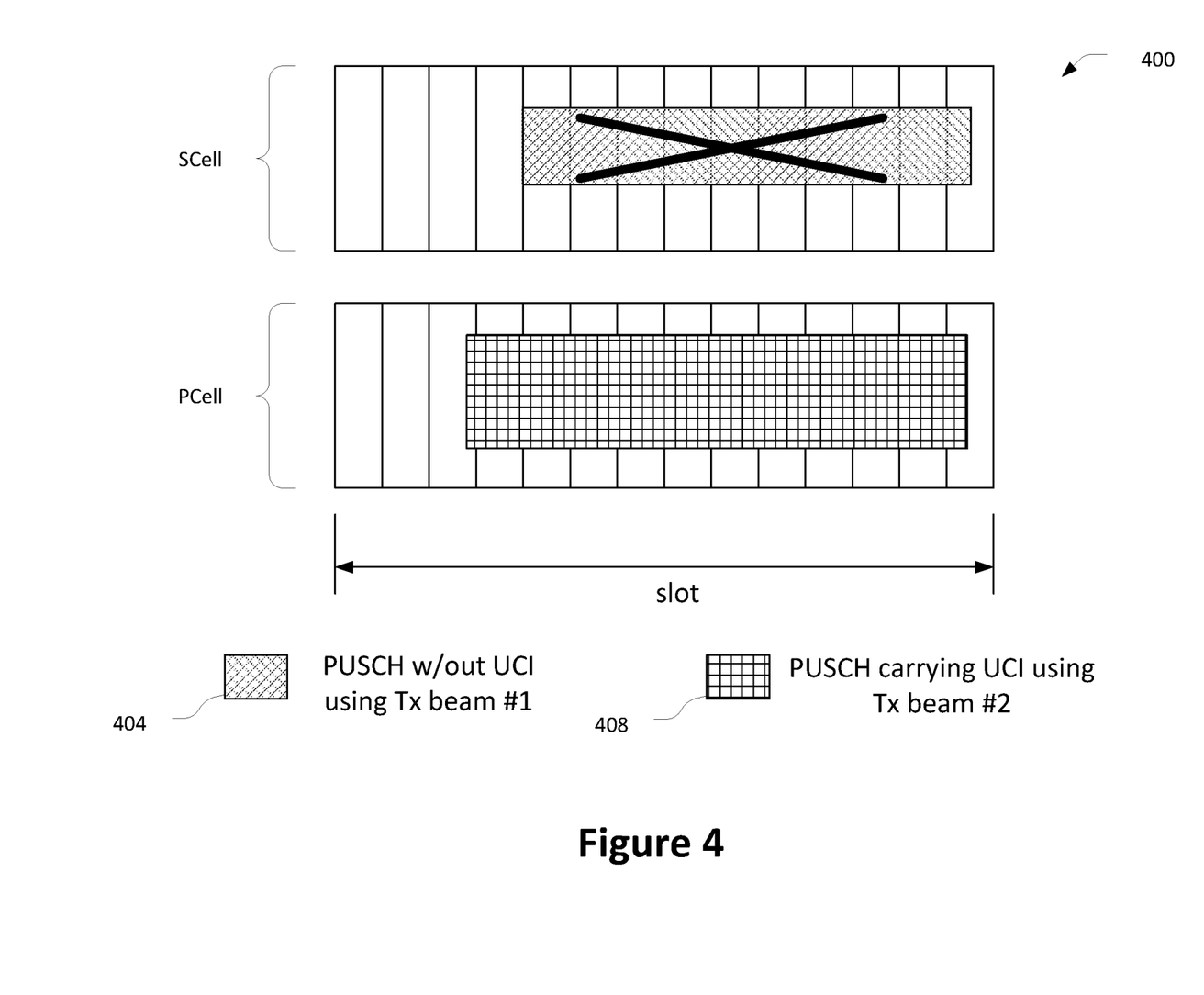
FIG. 4 illustrates a transmission scenario in accordance with some embodiments.

FIG. 4 illustrates a transmission scenario 400 in which PUSCHs are scheduled for simultaneous transmission with different Tx beams in different CCs in accordance with some embodiments. In transmission scenario 400, PUSCH 404 in the Scell may not include UCI and may be scheduled for transmission using Tx beam #1. PUSCH 408 in the PCell may include UCI and may be scheduled for transmission using Tx beam #2. Thus, according to the priority rule of this embodiment, the PUSCH 408 may be transmitted with Tx beam #2 and PUSCH 404 may either be dropped or transmitted with Tx beam #2.

Handling PUCCHs Scheduled to be Simultaneously Transmitted with Different Tx Beams In some embodiments, PUCCHs may be scheduled to be simultaneously transmitted with different Tx beams. Such scenarios may be handled as follows.

In embodiments, in cases when the UE 105 does not support simultaneous transmission of more than one physical channels/signals using distinct Tx beams, if a first PUCCH and a second PUCCH are multiplexed in a FDM manner in different CCs, and if the first and second PUCCH are indicated or configured with different filters, the UE 105 may drop one of the first and second PUCCH in accordance with a priority rule or UE may transmit first and second PUCCH using the Tx beam of the prioritized PUCCH.

In some embodiments, the priority rule can be defined as HARQ-ACK feedback>SR>CSI with higher priority>CSI with lower priority. If multiple UCI types are carried by a PUCCH, the UCI type with highest priority may be considered in the dropping rule.

In one example, if a first PUCCH carrying HARQ-ACK feedback and CSI report with lower priority is multiplexed in a FDM manner with a second PUCCH carrying SR, and the first and second PUCCH are indicated/configured with different Tx beams, the second PUCCH carrying SR is dropped or transmitted using the Tx beam of the first PUCCH.

In addition in accordance with some embodiments, if a first PUCCH carrying dynamic HARQ-ACK feedback and a second PUCCH carrying semi-persistent scheduled (SPS) HARQ-ACK feedback are multiplexed in an FDM manner, and the first and second PUCCH are indicated/configured with different beams, the second PUCCH is dropped or transmitted using the Tx beam of the first PUCCH. Dynamic HARQ-ACK feedback may correspond to the case where the HARQ-ACK is in response to a physical downlink shared channel (PDSCH) reception scheduled by a corresponding physical downlink control channel (PDCCH). In addition, SPS HARQ-ACK feedback may correspond to the case where the HARQ-ACK is in response to a PDSCH reception without an associated PDCCH.

Further, in case two PUCCHs carrying the same UCI type with same priority are multiplexed in an FDM manner, and the two PUCCHs are indicated/configured with different beams, the PUCCH on PCell is transmitted and the PUCCH on PUCCH SCell is dropped or transmitted using the Tx beam associated with the Pcell PUCCH.

Figure 5:
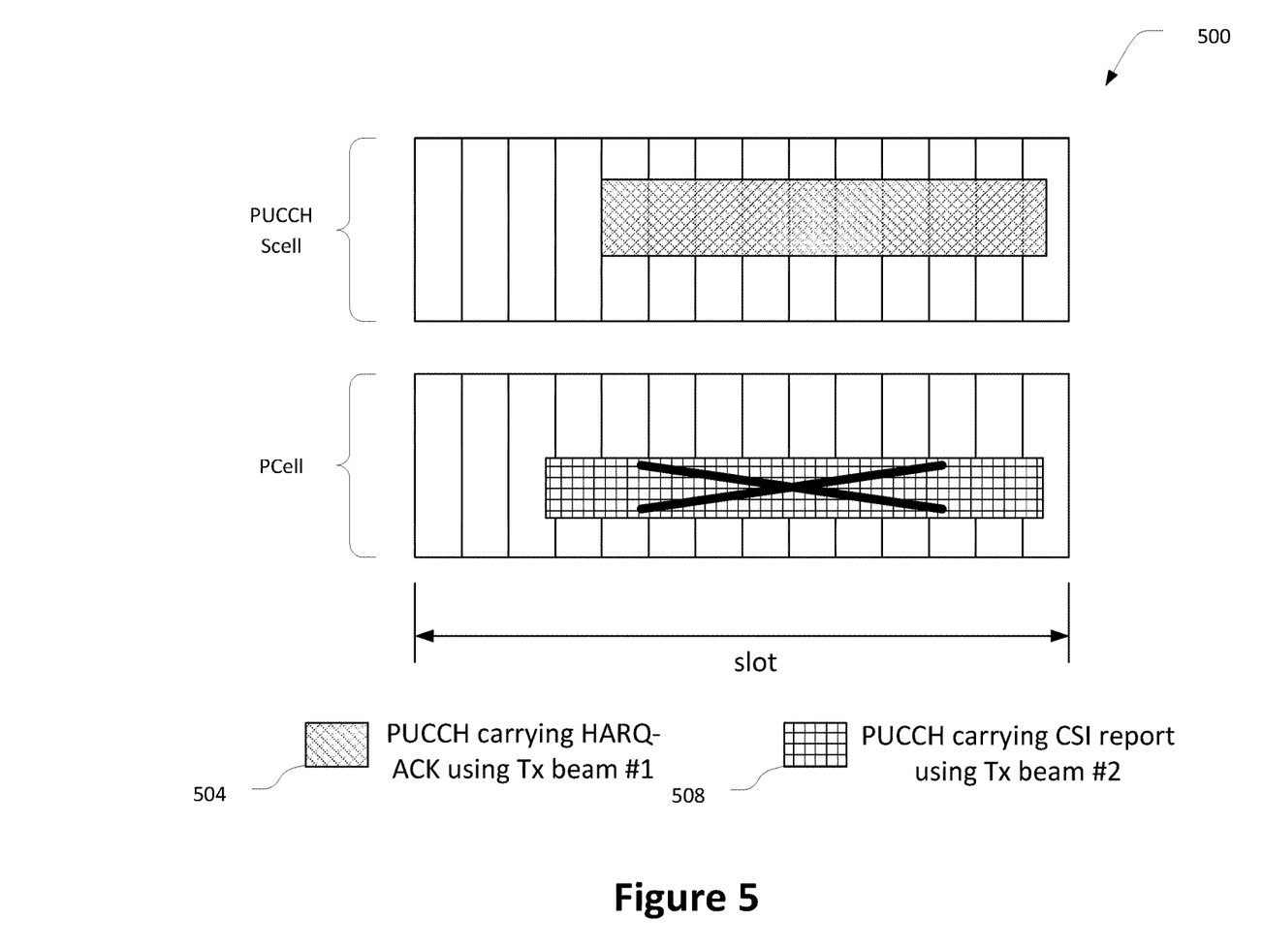
FIG. 5 illustrates a transmission scenario in accordance with some embodiments.

FIG. 5 illustrates a transmission scenario 500 in which PUCCHs are scheduled for simultaneous transmission with different Tx beams in different CCs in accordance with some embodiments. In transmission scenario 500, the UE 105 may be configured with two PUCCH groups, PUCCH 504 and PUCCH 508, where PUCCH is only transmitted in PCell and PUCCH SCell. PUCCH 504 may carry HARQ-ACK in the PUCCH Scell and may be scheduled for transmission using Tx beam #1. PUCCH 508 may carry a CSI report in the Pcell and may be scheduled for transmission using Tx beam #2. In this embodiment, given that the CSI report has lower priority than HARQ-ACK feedback, the PUCCH 504 may be transmitted using Tx beam #1 and PUCCH 508 may be dropped or transmitted using Tx beam #1.

In some embodiments, in cases when the UE 105 does not support simultaneous transmission of more than one physical channel/signal using distinct Tx beams, if a first PUCCH and a second PUCCH are multiplexed in a FDM manner in different CCs, and if the first and second PUCCH are indicated or configured with different spatial filters, the UE 105 may transmit one of the first and second PUCCH with smaller or larger PUCCH resource ID. The other PUCCH may be dropped or transmitted using the same Tx beam.

In one example, if a first PUCCH is configured or indicated with PUCCH resource 0, and a second PUCCH is configured with PUCCH resource 10, and the first and second PUCCH are indicated/configured with different beams, the second PUCCH with larger PUCCH resource ID may be dropped or transmitted using the same Tx beam as the first PUCCH with the smaller PUCCH resource ID.

Further, in case two PUCCHs with the same resource ID are multiplexed in a FDM manner, and the two PUCCH are indicated/configured with different beams, the PUCCH on the PCell may be transmitted and the PUCCH on the PUCCH SCell may dropped or transmitted using the same Tx beam as the PUCCH on the Pcell.

Handling PUSCH and PUCCH scheduled to be simultaneous transmitted with different Tx beams In some embodiments, a PUSCH and PUCCH may be scheduled to be simultaneously transmitted with different transmit beams. These embodiments are handled as follows.

In embodiments, in cases when the UE 105 does not support simultaneous transmission of more than one physical channels/signals using distinct Tx beams, if a PUCCH and a PUSCH are multiplexed in an FDM manner in different CCs, and if the PUCCH and PUSCH are indicated or configured with different spatial filters, the UE 105 may drop the PUCCH and transmit the PUSCH or the UE 105 may transmit both the PUCCH and the PUSCH using the PUSCH Tx beam.

Alternatively, the UE 105 may drop the PUSCH and transmit the PUCCH or transmit both using the PUCCH transmit beam. As a further extension, whether to drop or de-prioritize PUCCH or PUSCH may be configured by higher layers via multicast channel scheduling information (MSI), remaining minimum system information (RMSI), other system information (OSI), or RRC signalling.

In some embodiments, if a UCI carried by the PUCCH includes HARQ-ACK and/or SR, the PUSCH may be dropped or de-prioritized and the PUCCH may be transmitted or prioritized. In addition, if the PUSCH is a configured-grant transmission, the PUSCH may be dropped/de-prioritized and the PUCCH may be transmitted/prioritized. Further, if the UCI carried by the PUCCH includes periodic or semi-persistent CSI report, the PUCCH may be dropped/de-prioritized and PUSCH may be transmitted/prioritized.

In embodiments, in cases when the UE 105 does not support simultaneous transmission of more than one physical channels/signals using distinct Tx beams, if a PUCCH and a PUSCH are multiplexed in an FDM manner in different CCs, if the PUCCH and PUSCH are indicated or configured with different spatial filter, if a UCI is multiplexed on PUSCH, the priority rule can be used to determine whether UE transmits/prioritizes PUCCH or PUSCH.

In particular, the priority rule can be defined as HARQ-ACK feedback>SR>CSI with higher priority>CSI with lower priority. If multiple UCI types are carried by a PUCCH or PUSCH, the UCI type with highest priority is considered in the dropping/de-prioritization rule.

Further, in cases when the PUCCH and PUSCH carrying the same UCI type with same priority are multiplexed in an FDM manner, and the PUCCH and PUSCH are indicated/configured with different Tx beams, the PUCCH or PUSCH on the serving cell with smallest ServCellIndex may be transmitted/prioritized.

Figure 6:
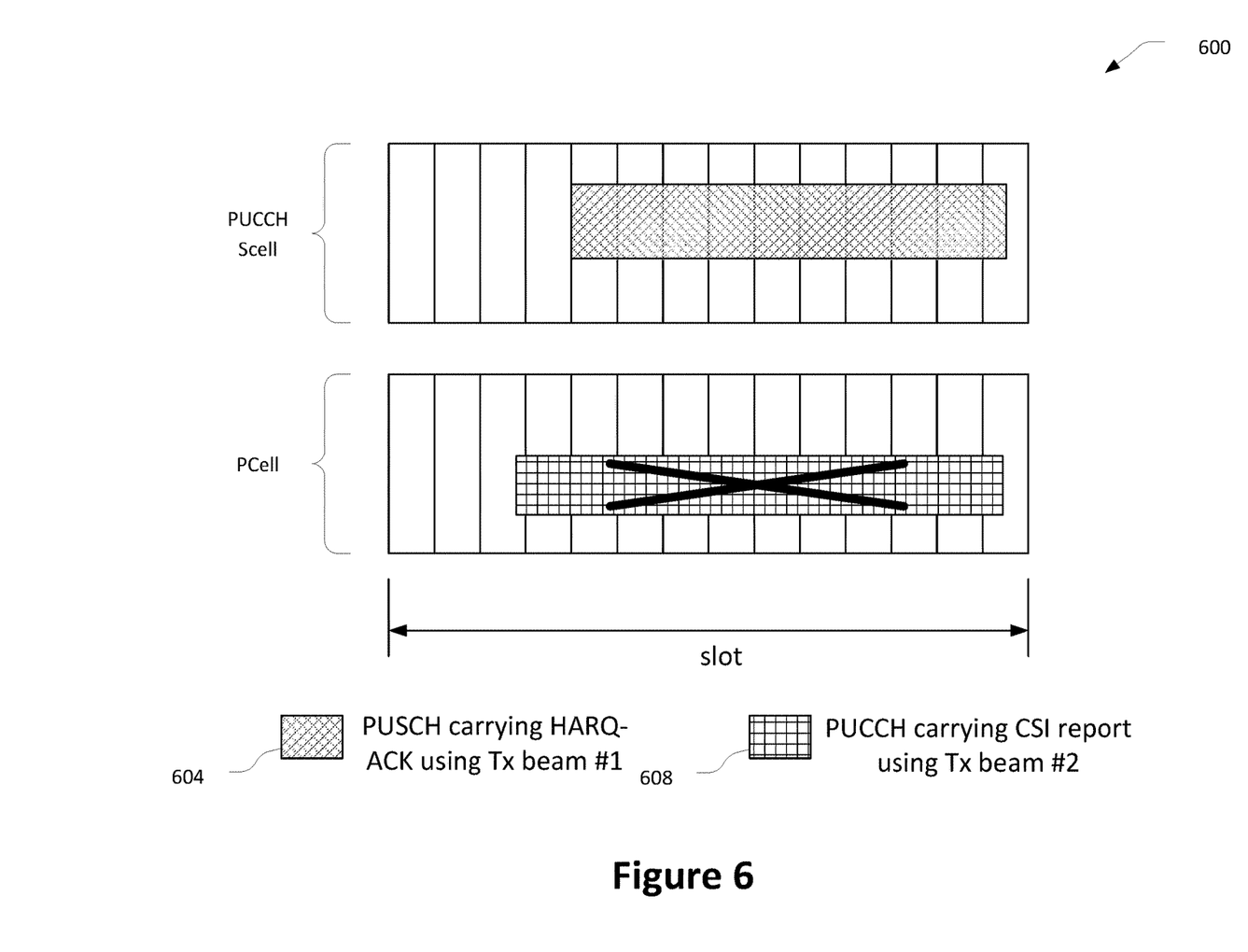
FIG. 6 illustrates a transmission scenario in accordance with some embodiments.

FIG. 6 illustrates a transmission scenario 600 in which a PUCCH and PUSCH are scheduled for simultaneous transmission with different Tx beams in different CCs in accordance with some embodiments. In transmission scenario 600, PUCCH 608 and PUSCH 604 are configured with different Tx beams and are multiplexed in an FDM manner in PCell and PUCCH SCell, respectively. The PUSCH 604 is carrying HARQ-ACK and the PUCCH 608 is carrying CSI. Given that the CSI report has lower priority than HARQ-ACK feedback, the PUSCH 604 is transmitted using Tx beam #1 and the PUCCH 608, carrying the CSI report, is dropped or transmitted using Tx beam #1.

In embodiments, for the UE 105 that does not support simultaneous transmission, the priority rule could be defined as follows: PRACH transmission on the PCell>PUCCH transmission with HARQ-ACK information and/or SR or PUSCH transmission with HARQ-ACK information>PUCCH transmission with CSI or PUSCH transmission with CSI>PUSCH transmission without HARQ-ACK information or CSI>SRS transmission, with aperiodic SRS having higher priority than semi-persistent and/or periodic SRS, or PRACH transmission on a serving cell other than the PCell.

In embodiments, the uplink signal/channel with lowest priority may be dropped if different Tx beams are applied.

Figure 7:
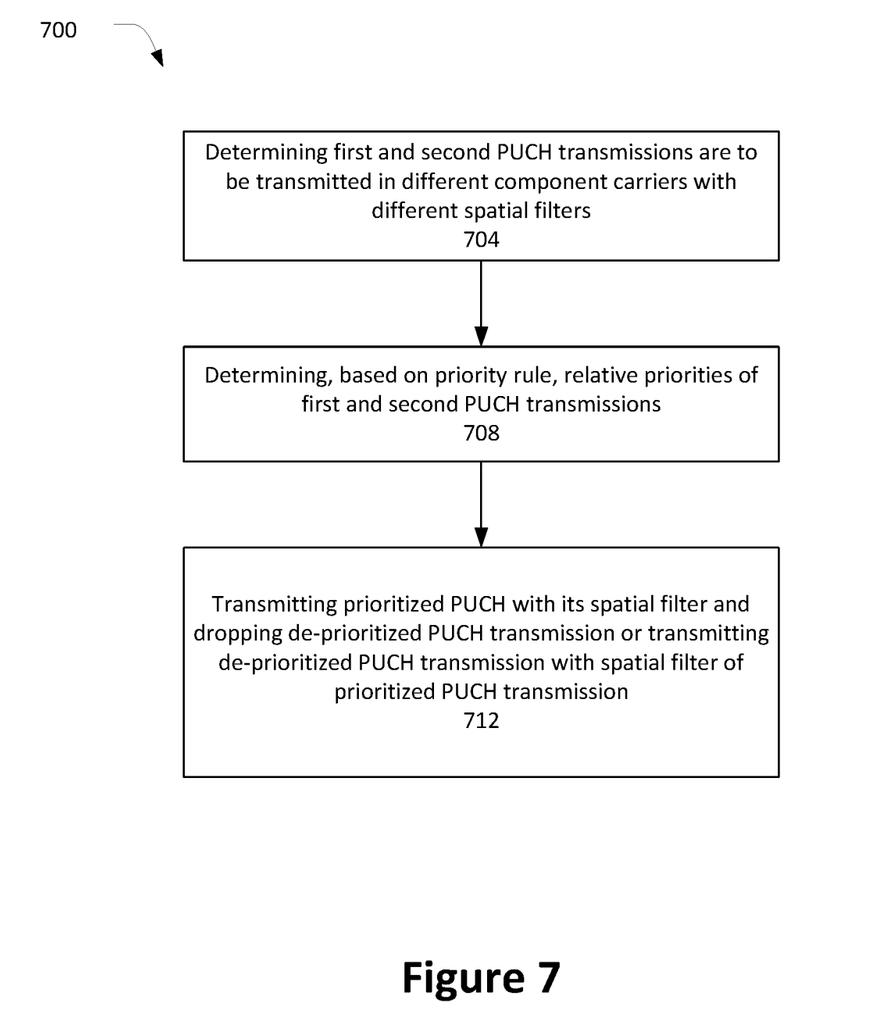
FIG. 7 illustrates an operation flow/algorithmic structure in accordance with some embodiments.

FIG. 7 illustrates an operation flow/algorithmic structure 700 in accordance with some embodiments. The operation flow/algorithmic structure 700 may be performed, in part or in whole, by the UE 105 or components thereof. For example, in some embodiments the operation flow/algorithmic structure 700 may be performed by transmit components of the UE 105.

The operation flow/algorithmic structure 700 may include, at 704, determining first and second PUCH transmissions are to be transmitted in different component carriers with different spatial filters. The PUCH transmissions may be scheduled (or otherwise determined) to be multiplexed in frequency with one another. In various embodiments, the PUCH transmissions may be PUSCH or PUCCH transmissions.

The operation flow/algorithmic structure 700 may further include, at 708, determining, based on a priority rule, relative priorities of the first and second PUCH transmissions. To determine the relative priorities, the UE 105 may determine that one of the PUCH transmissions, for example, the first PUCH transmission, is a prioritized transmission, and the second PUCH transmission, for example, the second PUCH transmission is a de-prioritized transmission.

In some embodiments, the priority rule may be provided to the UE 105 by the AN 110. In other embodiments, the UE 105 may be preconfigured with the priority rule.

The priority rule may provide relative priorities between PUC transmissions. The relative priorities may be based on type of PUCH transmissions (for example, PUSCH transmission or PUCCH transmission), content of the PUCH transmission (for example, HARQ-ACK information, CSI, etc.), or parameters associated with the PUCH transmission (for example, associate starting symbols, serving cell indices, etc.).

In some embodiments, a content-based priority rule provides relatively priorities, in decreasing order, as: a physical random access channel transmission on a primary cell; a PUCCH transmission with HARQ-ACK information or SR and a PUSCH transmission with HARQ-ACK information; a PUCCH/PUSCH transmission with CSI; a PUSCH transmission without HARQ-ACK or CSI; an aperiodic sounding reference signal (SRS); and a semi-persistent or periodic SRS.

The operation flow/algorithmic structure 700 may further include, at 712, transmitting the prioritized PUCH with its spatial filter and dropping de-prioritized PUCH transmission or transmitting de-prioritized PUCH transmission with spatial filter of prioritized PUCH transmission.

Figure 8:
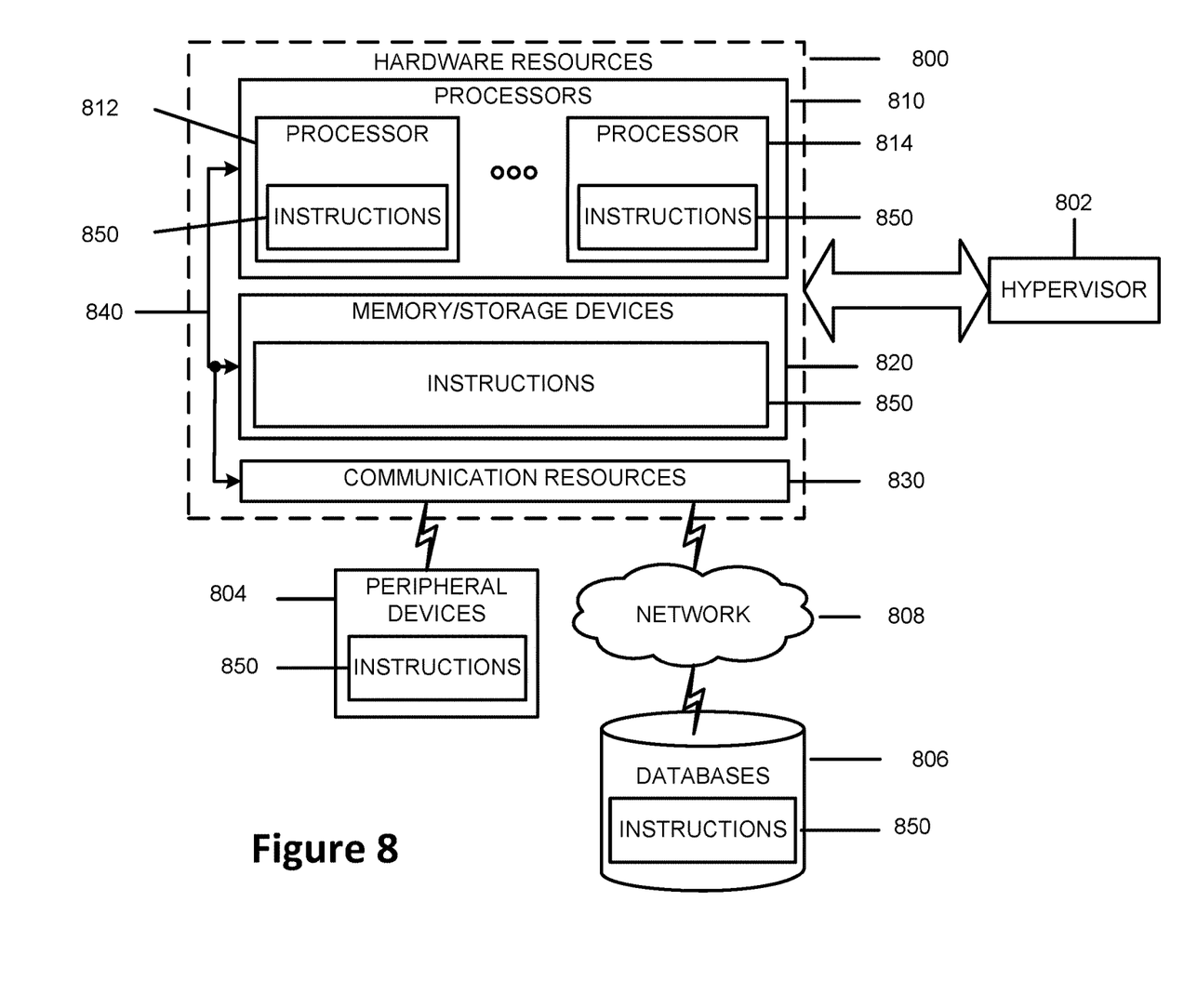
FIG. 8 is a block diagram illustrating components, according to some example embodiments, able to read instructions from a machine-readable or computer-readable medium (for example, a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 802 may be executed to provide an execution environment for one or more network slices/sub-slices to utilize the hardware resources 800. A "virtualized resource" may refer to compute, storage, and/or network resources provided by virtualization infrastructure to an application, device, system, etc.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of operating a UE, the method comprising: determining a first spatial filter for a first physical uplink channel (PUCH) transmission in a first component carrier; determining a second spatial filter for a second PUCH transmission in a second component carrier, the second spatial filter being different from the first spatial filter; determining, based on a priority rule, the first PUCH transmission has a higher priority than the second PUCH transmission; transmitting, based on said determination that the first PUCH transmission has the higher priority, the first PUCH transmission in the first component carrier with the first spatial filter; and transmitting the second PUCH in the second component carrier with the first spatial filter or dropping the second PUCH transmission.

Example 2 includes the method of example 1 or some other example herein, wherein the first PUCH transmission is a physical uplink control channel transmission, a physical uplink shared channel transmission, a physical random access channel transmission, or a sounding reference signal.

Example 3 includes the method of example 1 or some other example herein, further comprising determining the first spatial filter based on a quasi-colocation assumption.

Example 4 includes the method of example 1 or some other example herein, wherein the priority rule provides a higher priority for PUCH transmissions with earlier starting symbols and the first PUCH transmission includes a starting symbol that is earlier than a starting symbol of the second PUCH transmission.

Example 5 includes the method of example 1 or some other example herein, wherein the priority rule provides a higher priority for PUCH transmissions with smaller serving cell indices and the first PUCH transmission includes a serving cell index that is smaller than a serving cell index of the second PUCH transmission.

Example 6 includes a method of example 1 or some other example herein, wherein the first and second PUCH transmissions are first and second physical uplink shared channel (PUSCH) transmissions and the priority rule provides a higher priority for PUSCH transmissions that are grant-based transmissions.

Example 7 includes the method of example 6 or some other example herein, wherein grant-based transmissions are transmissions scheduled by DCI formats 0_0 or 0_1.

Example 8 includes the method of example 1 or some other example herein, wherein the first and second PUCH transmissions are first and second physical uplink shared channel (PUSCH) transmissions, the priority rule provides a higher priority for PUSCH transmissions that are multiplexed with uplink control information, the first PUSCH transmission is multiplexed with uplink control information, and the second PUSCH transmission is not multiplexed with uplink control information.

Example 9 includes a method of operating a UE, the method comprising: determining a first physical uplink channel (PUCH) transmission is to be transmitted in a first component carrier with a first transmit beam; determining a second PUCH transmission is to be transmitted in a second component carrier with a second transmit beam; determining, based on the priority rule, the first PUCH transmission has a higher priority than the second PUCH transmission; transmitting the first PUCH transmission with the first transmit beam; and transmitting the second PUCH transmission with the first transmit beam or drop the second PUCH transmission.

Example 10 includes the method of example 9 or some other example herein, wherein the first PUCH transmission is a first physical uplink shared channel (PUSCH) transmission multiplexed with first uplink control information (UCI), the second PUCH transmission is a second PUSCH transmission multiplexed with second UCI, the priority rule is to provide a priority ranking based on UCI content, and content of the first UCI having a higher priority than content of the second UCI.

Example 11 includes the method of example 9 or some other example herein, wherein the first PUCH transmission is a first physical uplink control channel (PUCCH) transmission having first PUCCH content, the second PUCH transmission is a second PUCCH transmission having second PUCCH content, the priority rule is to provide a priority ranking based on PUCCH content, and first PUCCH content having a higher priority than the second PUCCH content.

Example 12 includes the method of example 10 or 11 or some other example herein, wherein the priority ranking provides hybrid automatic repeat request-acknowledgment (HARQ) feedback with a higher priority than scheduling requests (SRs), SRs with higher priority than channel state information (CSI), and CSI with higher CSI priority higher priority than CSI with lower CSI priority.

Example 13 includes the method of example 11 or some other example herein, wherein the priority rule provides a priority based on an index of a PUCCH resource identifier.

Example 14 includes a method of example 9 or some other example herein, wherein the first PUCH transmission is a physical uplink shared channel (PUSCH) transmission, the second PUCH transmission is a physical uplink control channel PUCCH transmission, and the priority rule provides PUSCH transmissions with a higher priority than PUCCH transmissions.

Example 15 includes the method of example 9 or some other example herein, wherein the first PUCH transmission is a physical uplink control channel (PUCCH) transmission with first PUCCH content, the second PUCH transmission is a physical uplink shared channel (PUSCH) transmission, and the priority rule provides PUCCH transmissions with the first PUCCH content with a higher priority than PUSCH transmissions.

Example 16 includes the method of example 15 or some other example herein, wherein the first PUCCH content includes hybrid automatic repeat request-acknowledgment (HARQ) information or scheduling requests (SR).

Example 17 includes the method of example 9 or some other example herein, wherein the first PUCH transmission is a physical uplink control channel (PUCCH) transmission, the second PUCH transmission is a grant-based physical uplink shared channel (PUSCH) transmission, and the priority rule provides PUCCH transmissions with a higher priority than grant-based PUSCH transmissions.

Example 18 includes a method of example 9 or some other example herein, wherein the first PUCH transmission is a physical uplink shared channel (PUSCH) transmission, the second PUCH transmission is a physical uplink control channel PUCCH transmission that includes a periodic or semi-persistent channel state information (CSI) report, and the priority rule provides PUSCH transmissions with a higher priority than PUCCH transmissions that include periodic or semi-persistent CSI reports.

Example 19 includes the method of example 9 or some other example herein, wherein one of the first or second PUCH transmission is a physical uplink shared channel (PUSCH) transmission multiplexed with first control information, the other of the first or second PUCH transmission is a physical uplink control channel (PUCCH) having second control information, the priority rule is to provide a priority ranking based on control information, and the processing circuitry is to determine the first PUCH transmission has a higher priority than the second PUCH transmission based on relative priorities of the first and second control information.

Example 20 includes a method of example 9 or some other example herein, wherein the priority rule provides relatively priorities, in decreasing order, as: a physical random access channel transmission on a primary cell; a physical uplink control channel (PUCCH) transmission with hybrid automatic repeat request-acknowledgment (HARQ-ACK) information or scheduling request and a physical uplink shared channel (PUSCH) transmission with HARQ-ACK information; a PUCCH/PUSCH transmission with channel state information (CSI); a PUSCH transmission without HARQ-ACK or CSI; an aperiodic sounding reference signal (SRS); and a semi-persistent or periodic SRS.

Example 21 includes a method of operating a UE, the method comprising: determining first and second physical uplink channel (PUCH) transmissions are to be multiplexed in frequency and are to be transmitted with first and second spatial filters, respectively; determining the first PUCH transmission is a prioritized transmission and the second PUCH transmission is a de-prioritized transmission; transmitting the first PUCH transmission with the first spatial filter; and dropping the second PUCH transmission or transmitting the second PUCH transmission with the first spatial filter.

Example 22 includes a method of example 21 or some other example herein, wherein to determine the first PUCH transmission is a prioritized transmission and the second PUCH transmission is a de-prioritized transmission based on a priority rule.

Example 23 includes a method of example 22 or some other example herein, wherein the priority rule is to prioritize PUCH transmissions based on type of PUCH transmission, content of PUCH transmission, or parameters associated with PUCH transmission.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A non-transitory computer-readable medium having instructions stored theron that, when executed by one or more processors, cause a user equipment (UE) to:
    determine that a first physical uplink channel (PUCH) transmission is to be transmitted in a first component carrier and that a second PUCH transmission is to be transmitted in a second component carrier;
    determine a first spatial filter for the first PUCH transmission;
    determine a second spatial filter for the second PUCH transmission, the second spatial filter being different from the first spatial filter;
    determine, based on a priority rule, that the first PUCH transmission has a higher priority than the second PUCH transmission;
    transmit, based on the determination that the first PUCH transmission has the higher priority, the first PUCH transmission in the first component carrier with the first spatial filter; and
    transmit the second PUCH in the second component carrier with the first spatial filter or drop the second PUCH transmission.

2. The non-transitory computer-readable medium of claim 1, wherein the first PUCH transmission is a physical uplink control channel transmission, a physical uplink shared channel transmission, a physical random access channel transmission, or a sounding reference signal.

3. The non-transitory computer-readable medium of claim 1, wherein the instructions, when executed, further cause the UE to determine the first spatial filter based on a quasi-colocation assumption.

4. The non-transitory computer-readable medium of claim 1, wherein the priority rule provides a higher priority for PUCH transmissions with earlier starting symbols, and the first PUCH transmission includes a starting symbol that is earlier than a starting symbol of the second PUCH transmission.

5. The non-transitory computer-readable medium of claim 1, wherein the priority rule provides a higher priority for PUCH transmissions with smaller serving cell indices, and the first PUCH transmission includes a serving cell index that is smaller than a serving cell index of the second PUCH transmission.

6. The non-transitory computer-readable medium of claim 1, wherein the first and second PUCH transmissions are first and second physical uplink shared channel (PUSCH) transmissions, respectively, and wherein the priority rule provides a higher priority for PUSCH transmissions that are grant-based transmissions.

7. The non-transitory computer-readable medium of claim 6, wherein grant-based transmissions are transmissions scheduled by downlink control information (DCI) formats 0 0 or 0 1.

8. The non-transitory computer-readable medium of claim 1,
    wherein the first and second PUCH transmissions are first and second physical uplink shared channel (PUSCH) transmissions, respectively,
    wherein the priority rule provides a higher priority for PUSCH transmissions that are multiplexed with uplink control information,
    wherein the first PUSCH transmission is multiplexed with uplink control information, and
    wherein the second PUSCH transmission is not multiplexed with uplink control information.

9. An apparatus comprising:
    a memory that stores a priority rule; and
    processing circuitry, coupled with the memory, configured to:
        determine that a first physical uplink channel (PUCH) transmission is to be transmitted in a first component carrier with a first transmit beam;
        determine that a second PUCH transmission is to be transmitted in a second component carrier with a second transmit beam;
        determine, based on the priority rule, that the first PUCH transmission has a higher priority than the second PUCH transmission;
        transmit the first PUCH transmission with the first transmit beam; and
        transmit the second PUCH transmission with the first transmit beam or drop the second PUCH transmission.

10. The apparatus of claim 9,
    wherein the first PUCH transmission is a first physical uplink shared channel (PUSCH) transmission multiplexed with first uplink control information (UCI), and the second PUCH transmission is a second PUSCH transmission multiplexed with second UCI,
    wherein the priority rule provides a priority ranking based on UCI content and
    wherein content of the first UCI has a higher priority than content of the second UCI.

11. The apparatus of claim 9, wherein the first PUCH transmission is a first physical uplink control channel (PUCCH) transmission having first PUCCH content, and the second PUCH transmission is a second PUCCH transmission having second PUCCH content,
    wherein the priority rule provides a priority ranking based on PUCCH content, and
    wherein the first PUCCH content has a higher priority than the second PUCCH content.

12. The apparatus of claim 10, wherein the priority ranking provides hybrid automatic repeat request-acknowledgment (HARQ) feedback with a higher priority than scheduling requests (SRs), SRs with higher priority than high-priority channel state information (CSI), and high-priority CSI with higher priority than low-priority CSI.

13. The apparatus of claim 11, wherein the priority rule provides a priority based on an index of a PUCCH resource identifier.

14. The apparatus of claim 9, wherein the first PUCH transmission is a physical uplink shared channel (PUSCH) transmission, the second PUCH transmission is a physical uplink control channel PUCCH transmission, and the priority rule provides PUSCH transmissions with a higher priority than PUCCH transmissions.

15. The apparatus of claim 9, wherein the first PUCH transmission is a physical uplink control channel (PUCCH) transmission with first PUCCH content, the second PUCH transmission is a physical uplink shared channel (PUSCH) transmission, and the priority rule provides PUCCH transmissions with the first PUCCH content with a higher priority than PUSCH transmissions.

16. The apparatus of claim 15, wherein the first PUCCH content includes hybrid automatic repeat request-acknowledgment (HARQ) information or scheduling requests (SR).

17. The apparatus of claim 9, wherein the first PUCH transmission is a physical uplink control channel (PUCCH) transmission, the second PUCH transmission is a grant-based physical uplink shared channel (PUSCH) transmission, and the priority rule provides PUCCH transmissions with a higher priority than grant-based PUSCH transmissions.

18. The apparatus of claim 9,
wherein the first PUCH transmission is a physical uplink shared channel (PUSCH) transmission, the second PUCH transmission is a physical uplink control channel PUCCH transmission that includes a periodic or semi-persistent channel state information (CSI) report, and
wherein the priority rule provides PUSCH transmissions with a higher priority than PUCCH transmissions that include periodic or semi-persistent CSI reports.

19. The apparatus of claim 9,
wherein one of the first or second PUCH transmissions is a physical uplink shared channel (PUSCH) transmission multiplexed with first control information, and the other of the first or second PUCH transmission is a physical uplink control channel (PUCCH) having second control information,
wherein the priority rule provides a priority ranking based on control information, and
wherein the processing circuitry is further configured to determine that the first PUCH transmission has a higher priority than the second PUCH transmission based on relative priorities of the first and second control information.

20. A non-transitory computer-readable medium having instructions stored thereon that, when executed, cause a user equipment (UE) to:
determine that first and second physical uplink channel (PUCH) transmissions are to be multiplexed in frequency and are to be transmitted with first and second spatial filters, respectively;
determine that the first PUCH transmission is a prioritized transmission and that the second PUCH transmission is a de-prioritized transmission;
transmit the first PUCH transmission with the first spatial filter; and
transmit the second PUCH transmission with the first spatial filter, or drop the second PUCH transmission.

* * * * *

UNITED STATES PATENT AND TRADEMARK OFFICE
CERTIFICATE OF CORRECTION

PATENT NO. : 11,882,556 B2
APPLICATION NO. : 17/282931
DATED : January 23, 2024
INVENTOR(S) : Xiong et al.

It is certified that error appears in the above-identified patent and that said Letters Patent is hereby corrected as shown below:

In the Claims

In Column 15, Claim 1, Line 32, delete "theron" and insert -- thereon --, therefor.

Signed and Sealed this
Sixteenth Day of April, 2024

Katherine Kelly Vidal
Director of the United States Patent and Trademark Office